United States Patent [19]
Ochiai et al.

[11] Patent Number: 5,592,218
[45] Date of Patent: Jan. 7, 1997

[54] IMAGE READING APPARATUS HAVING IMPROVED SHADING CORRECTION AND QUANTITY OF LIGHT RATIO MEASUREMENT

[75] Inventors: Toru Ochiai, Matsudo; Hidehisa Tsuchihashi; Soichi Ueta, both of Kawasaki, all of Japan

[73] Assignee: Nikon Corporation, Tokyo, Japan

[21] Appl. No.: 450,575

[22] Filed: May 25, 1995

Related U.S. Application Data

[63] Continuation of Ser. No. 201,123, Feb. 24, 1994, abandoned.

[30] Foreign Application Priority Data

Feb. 24, 1993 [JP] Japan ................................. 5-033804

[51] Int. Cl.$^6$ .................................................. H04N 5/253
[52] U.S. Cl. .......................................... 348/110; 348/251
[58] Field of Search .................................. 348/96, 97, 110, 348/111, 100, 98, 99, 105, 112, 251; H04N 5/253

[56] References Cited

U.S. PATENT DOCUMENTS

| | | |
|---|---|---|
| 4,734,762 | 3/1988 | Aoki et al. . |
| 4,987,485 | 1/1991 | Hirota . |
| 5,155,596 | 10/1992 | Kurtz et al. ................................. 348/97 |
| 5,191,406 | 3/1993 | Brandestini et al. ..................... 348/111 |
| 5,268,752 | 12/1993 | Fukada et al. . |
| 5,337,164 | 8/1994 | Yabe et al. ................................. 348/97 |

FOREIGN PATENT DOCUMENTS 3013166  1/1991  Japan .............................. H04N 1/04

OTHER PUBLICATIONS

European Search Report dated Jul. 4, 1994.

*Primary Examiner*—Michael Horabik
*Assistant Examiner*—Michael Day
*Attorney, Agent, or Firm*—Staas & Halsey

[57] ABSTRACT

An image reading apparatus for reading an image on film which uses a shading correction coefficient computation unit for obtaining a shading correction coefficient in order to correct irregularities in image signals of a photoelectric conversion unit, and a quantity of light ratio measurement unit for obtaining the ratio of the quantity of light of each emission color in order to equalize the quantity of light emitted by a light emission unit. The shading correction coefficient and the quantity of light ratio are obtained immediately before reading of a first original medium, and additional original mediums can then be read using the correction coefficients obtained for the first original. Alternately, the shading correction coefficient and the quantity of light ratio can be obtained immediately before reading each original medium.

13 Claims, 5 Drawing Sheets

IMAGE READING APPARATUS HAVING IMPROVED SHADING CORRECTION AND QUANTITY OF LIGHT RATIO MEASUREMENT

This application is a continuation of application Ser. No. 08/201,123, filed Feb. 24, 1994, now abandoned.

BACKGROUND. OF THE INVENTION

1. Field of the Invention

This invention relates to an image reading apparatus, commonly referred to as a "scanner" and, more particularly, to an image reading apparatus for reading 35 mm film and similar image recording mediums.

2. Description of the Related Art

A conventional image reading apparatus used to read an image on original 35 mm film is illustrated in FIG. 1.

A film original 3 is held by carriage 2 and a three-color separation filter 17 is arranged in front of carriage 2. Separation filter 17 is, for example, a filter for the primary colors of R (red), G (green), and B (blue). A white light source 16 is arranged in front of separation filter 17.

Mechanical changeover of separation filter 17 is conducted by filter drive circuit 18, which is controlled by CPU 13 via I/O 8. White light source 16 illuminates film original 3 through separation filter 17 and the transmitted light conducts image formation in CCD line sensor 4. Stepping motor 7 allows carriage 2 to move in a direction parallel with CCD line sensor 4. The formation image of CCD line sensor 4 is formed in a parallel manner (subscanning) by the parallel movement of carriage 2. CCD line sensor 4 is arranged so that its scanning direction is orthogonal to the direction of movement of the formation image (main scanning).

Shading correction circuit 20 is a circuit designed to correct the irregularities in the quantity of light which illuminate CCD line sensor 4. Correction data for the unevenness of exposure, determined at the time of factory shipment, is stored in advance in EEPROM 19. Using this correction data, the correction of output signals of CCD line sensor 4 is conducted.

Stepping motor 7 is controlled by stepping motor drive circuit 6 via I/O 9 according to the commands of CPU 13. Moreover, CCD line sensor 4 is controlled by CCD drive circuit 11 and image signals of CCD line sensor 4 for the main scanning direction are output to shading correction circuit 20. After irregularity correction by shading correction circuit 20, the output of shading correction circuit 20 is converted into digital data by A/D converter 10 and stored in memory 12.

Stepping motor drive circuit 6 intermittently moves carriage 2 at uniform intervals and, with each movement, the image output of CCD line sensor 4 is converted into digital data by A/D converter 10.

When the reading of film original 3 is completed, the data stored in memory 12 is output to host computer 15 via SCSI interface 14 and is used as the image data.

FIG. 2 is a flow chart which shows an operational process of a device as configured in FIG. 1. With this operational process, after the power source has been turned ON at step S30, an operational check of memory in the reader main body is performed at step S32 and initialization of the reading mechanical system is conducted at step S34. Image reading of film original 3 is performed at step S36 using the shading correction coefficient and the coefficient of the quantity of light ratio for the separated colors of the light source, wherein both coefficients are stored in advance (at the time of factory shipment) in EEPROM 19. In step S38, the image is transferred to host computer 15.

Since these devices require a memory element, such as EEPROM 19, higher costs are incurred. In particular, a costly process for the writing of EEPROM 19 at the time of factory shipment becomes necessary.

In addition, when the quantity of light of the white light source changes due to a change in voltage or a deterioration of the light source over time, correction data which is different from the correction data at the time of factory shipment becomes necessary. Therefore, the correction data stored in EEPROM 19 is no longer accurate and a corrected shading correction coefficient and a new measurement of the quantity of light ratio must be obtained. Obtaining this new data requires separation filter 17 to be mechanically switched each time a correction is performed. As a result, not only does the time required for the starting of the device become longer by the amount of the switching time of the separation filter, but a conspicuous wear of mechanical parts pertaining to insertion and removal of the separation filter is also incurred.

SUMMARY OF THE INVENTION

Accordingly, it is an object of the present invention to improve image reading by obtaining correction coefficients, such as the shading correction coefficient and the quantity of light ratio in color separation, without using predetermined correction coefficients stored in a memory element.

It is an additional object of the present invention to shorten the time required for starting the image reading process when the power source of the device is ON.

Additional objects and advantages of the invention will be set forth in part in the description which follows, and, in part, will be obvious from the description, or may be learned by practice of the invention.

The foregoing objects of the present invention are achieved by providing an image reading apparatus comprising a light emission unit for emitting colors of light, a photoelectric conversion unit for receiving the light emitted by the light emission unit after the emitted light is passed through a first original medium, and a correction coefficient computation unit for determining correction coefficients for each color emitted by the light emission unit and received by the photoelectric conversion unit, wherein the correction coefficient computation unit determines the correction coefficients immediately before reading of a first original medium, and additional original mediums can then be read using the correction coefficients obtained for the first original.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
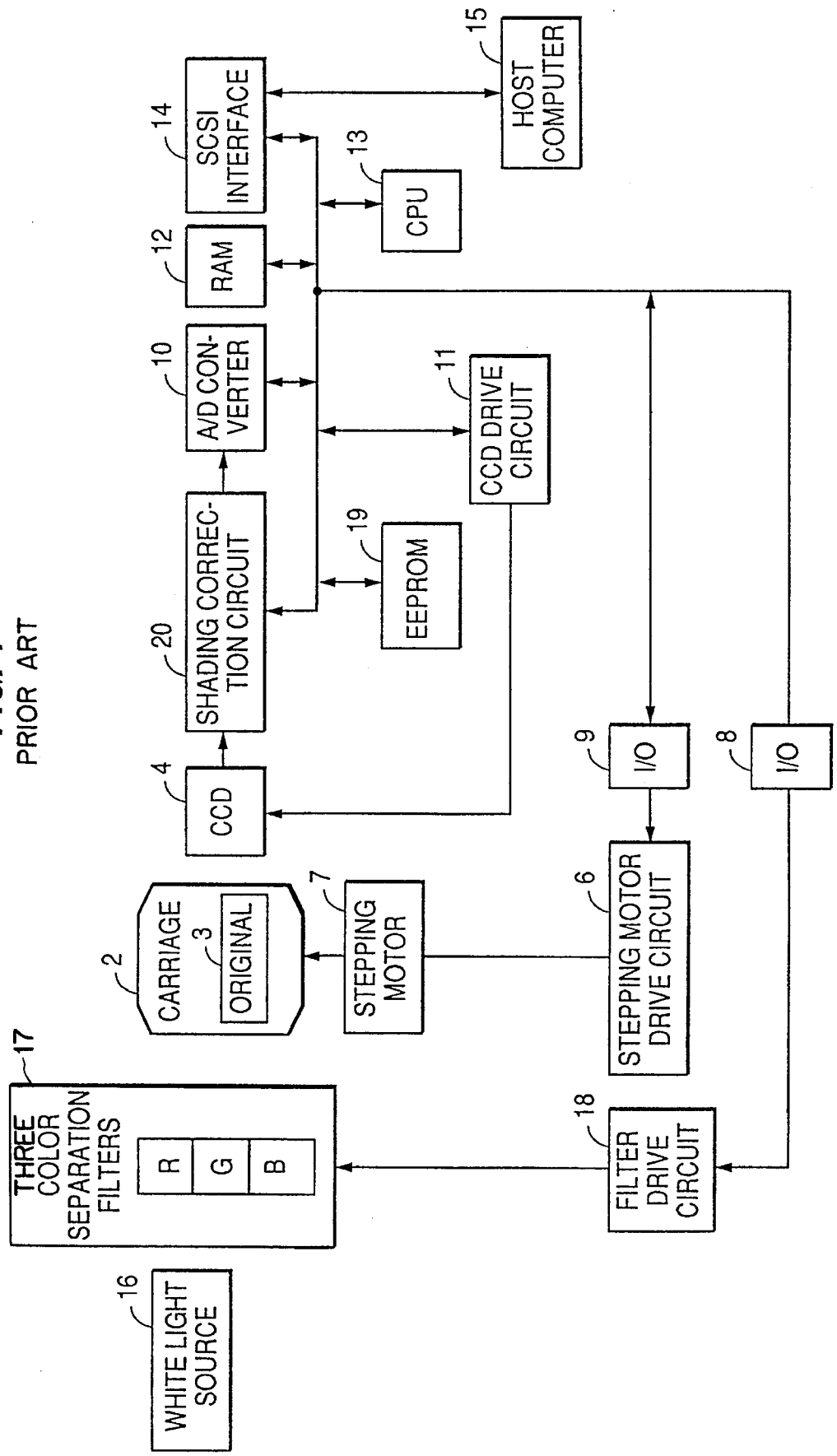
FIG. 1 is a schematic diagram of a conventional film image reading apparatus.
Figure 2:
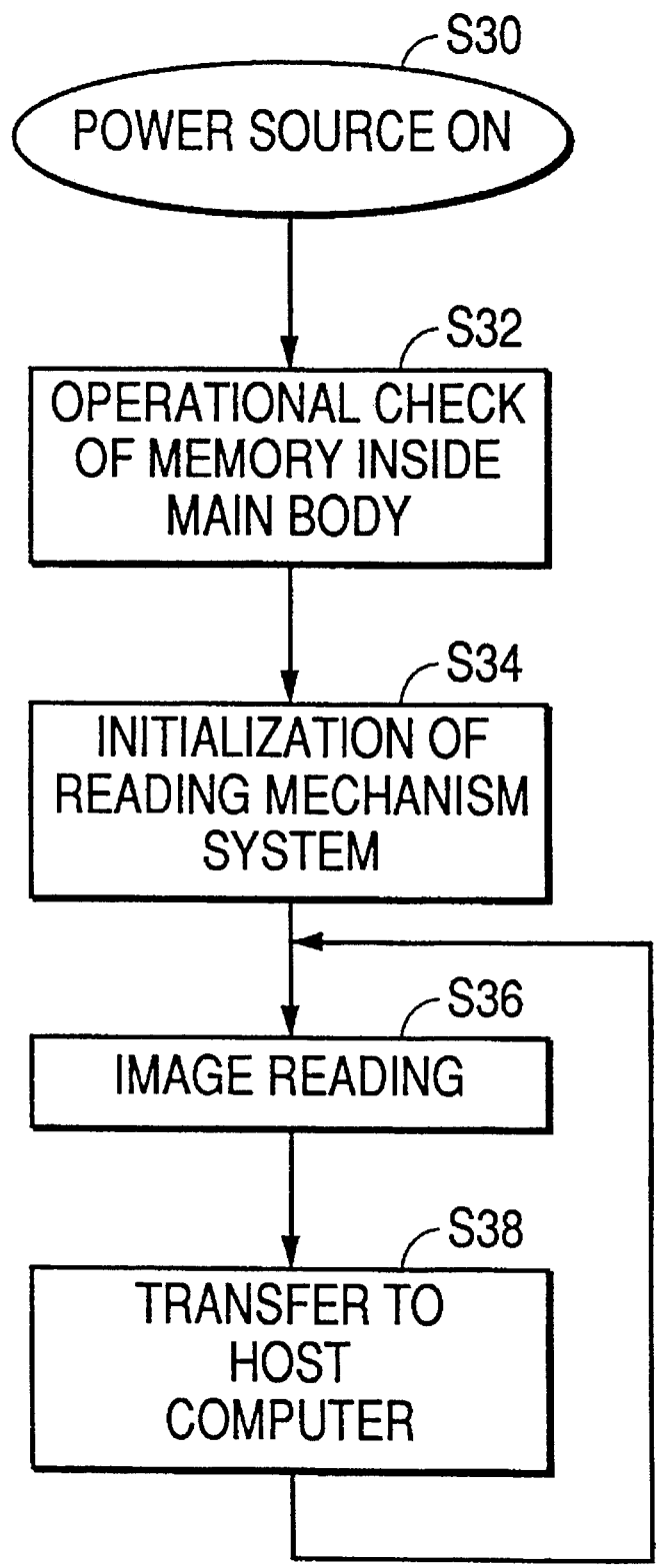
FIG. 2 is a flow chart which shows an example of conventional operations of a film image reading apparatus of FIG. 1.

Reference will now be made in detail to the present preferred embodiments of the present invention, examples of which are illustrated in the accompanying drawings, wherein like reference numerals refer to like elements throughout.

Figure 3:
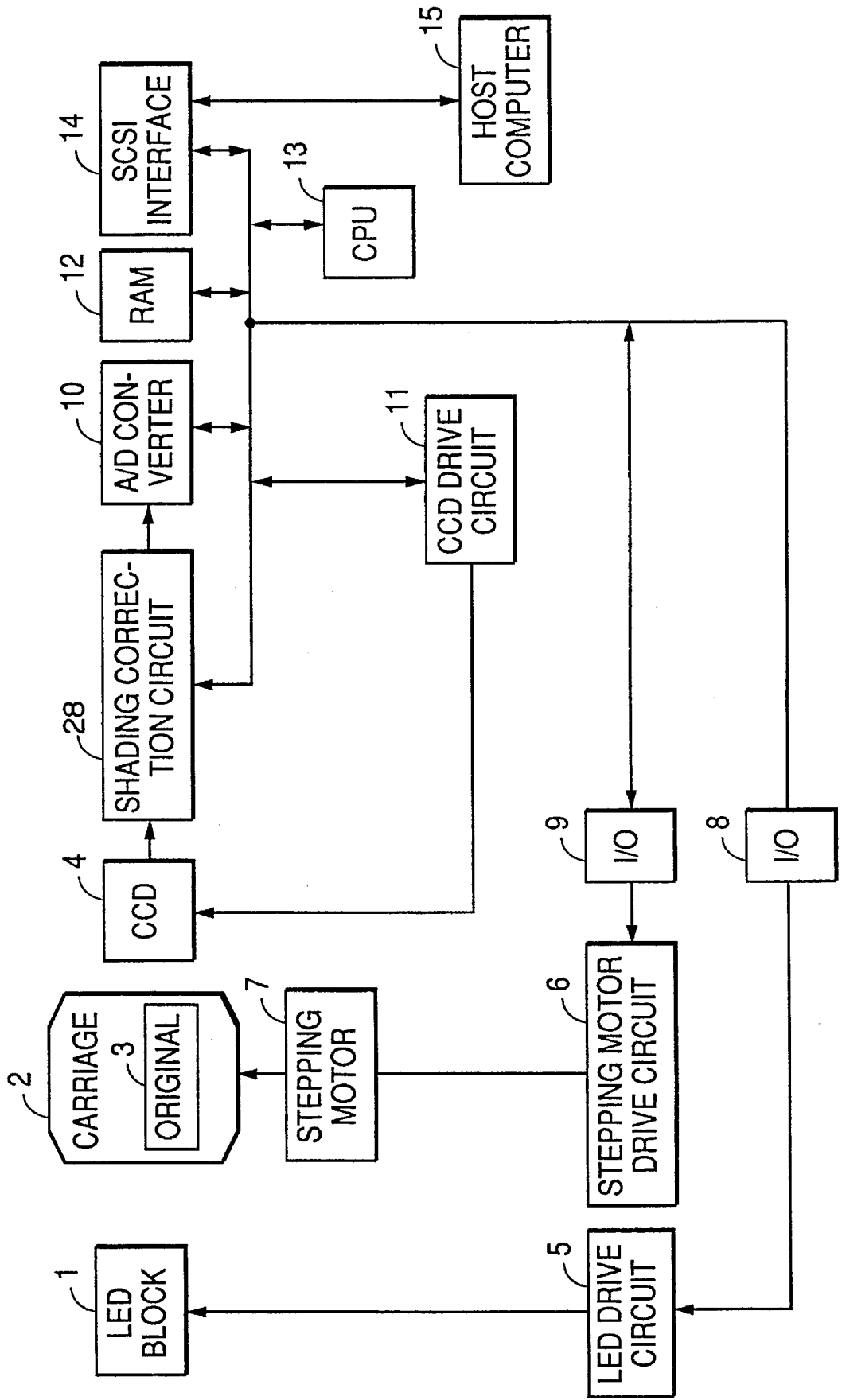
FIG. 3 is a schematic diagram of a film image reading apparatus of the present embodiment.

FIG. 3 is a diagram illustrating a configuration of an embodiment of an image reading apparatus according to the present invention. LED block 1 is a light source capable of light emission of respective colors of R (red), G (green), and B (blue). LED block 1 is driven by LED drive circuit 5. The selection of colors and the light emission time are conducted based on commands from CPU 13 via I/O 8 and executed by LED drive circuit 5.

A film original 3 is held by carriage 2 with LED block 1 arranged in front of carriage 2. LED block 1 illuminates film original 3 and the transmitted light conducts image formation in CCD line sensor 4. CCD line sensor 4 is controlled by CCD drive circuit 11 and the image signals of CCD line sensor 4 of the main scanning direction are output to shading correction circuit 28.

Stepping motor 7 is controlled by stepping motor drive circuit 6 via I/O 9 according to the commands of CPU 13. Stepping motor 7 intermittently moves carriage 2 whenever the signals of the main scanning direction of CCD line sensor 4 have all been output to shading correction circuit 28. At every step, the image signals of CCD line sensor 4 are converted into digital data by A/D converter 10 and incorporated into a total image.

Shading correction circuit 28 is designed to correct the irregularities in the quantity of light of LED block 1 illuminating CCD line sensor 4. Through the use of correction coefficients, it is possible to correct the output signals of CCD line sensor 4. For example, shading correction circuit 28 is able to obtain the appropriate image signal by multiplying the correction coefficient by the output signal of CCD line sensor 4 through, for example, a D/A converter (not illustrated) and a multiplier (not illustrated). After the unevenness of image signals of CCD line sensor 4 has been corrected by shading correction circuit 28, the image signals are converted into digital data by A/D converter 10 and stored in memory 12, which is typically a RAM.

When the reading of film original 3 is completed, the data stored in memory 12 is output to host computer 15 via SCSI interface 14 and is used as the image data.

Figure 4A:
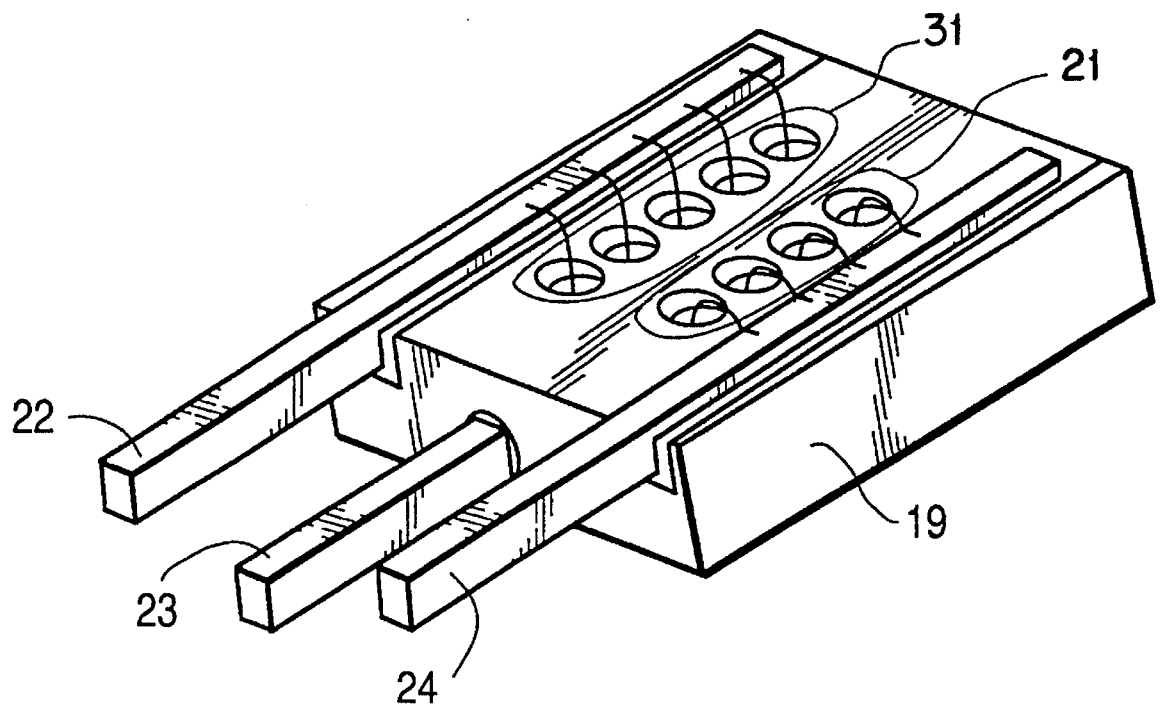
FIGS. 4(A) and 4(B) are an oblique view and a cross-sectional view, respectively, of an LED block used in the present embodiment.
Figure 4B:
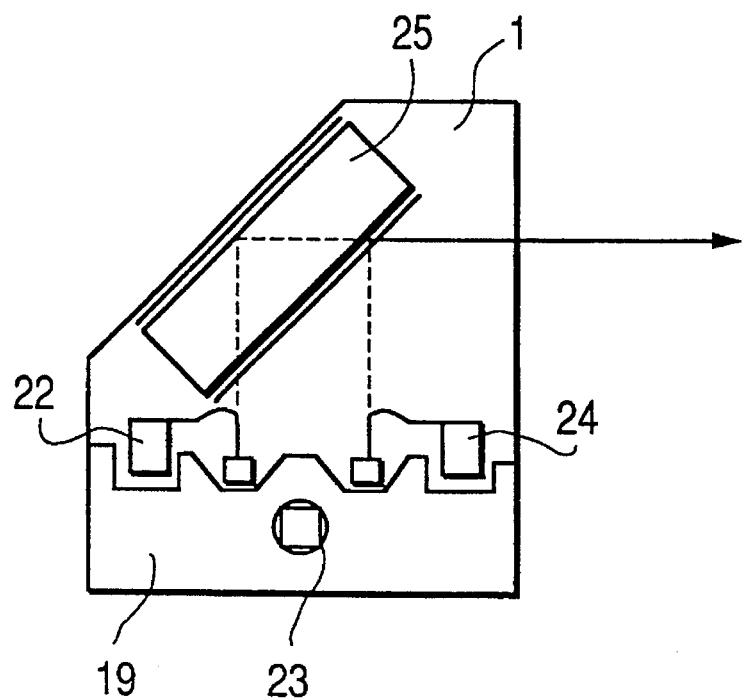

FIGS. 4(A) and 4(B) are an oblique view and a cross-sectional view, respectively, of LED block 1 used in the present embodiment. Two rows 31 and 21 of LEDs reside on substrate 19. Row 31 contains a plurality of blue LEDs and row 21 contains red and green LEDs. The red, green, and blue LEDs in rows 31 and 21 are each lit up by respective electrodes 22 and 24 and common electrode 23. Dichroic mirror 25 is used to superimpose light emitted by the LEDs of rows 31 and 21. Since the quantity of emitted light per blue LED in row 31 is small, five blue LEDs are provided in row 31 in the present embodiment.

Since flashing of the red, green and blue LEDs in rows 31 and 21 is rapid and there are no mechanical drive parts for the insertion/removal of a separation filter, measurement pertaining to the shading coefficient and the quantity of light ratio for color separation in the light source can be conducted in a short time. This time is approximately one to three seconds. As a result, measurement of the shading correction coefficient and the quantity of light ratio in color separation can be obtained when the power source is turned ON. Moreover, such measurements are not limited to being performed when the power source is turned ON. The shading correction coefficient can also be obtained immediately before the reading of film original 3.

Figure 5:
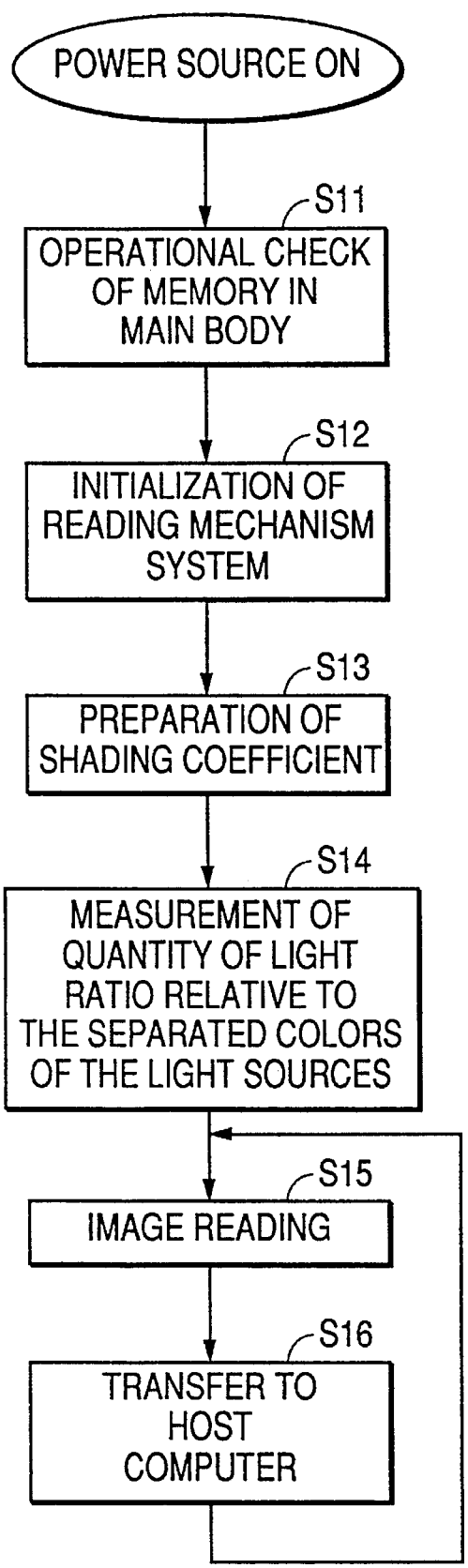
FIG. 5 is a flow chart which shows one example of the operations of the present embodiment.

FIG. 5 is a flow chart of the method for obtaining the shading correction coefficient and the measurement of the quantity of light ratio in color separation.

After the power source has been turned ON in step S10, an operational check of a memory (not illustrated) inside the reader main body (not illustrated) is performed at step S11. Initialization of the reading mechanical system is performed at step S12, wherein carriage 2 returns to an origin position.

Next, in step S13, determination of the shading correction coefficient is conducted, preferably in shading correction circuit 28 or CPU 13. Ideally, it is desirable that LEDs in rows 31 and 21 completely and uniformly illuminate CCD line sensor 4. However, in reality there exist irregularities in the quantity of light illuminating CCD line sensor 4. To correct for these irregularities, for example, red LEDs are made to emit light and the CCD line sensor output waveform is observed at a specified exposure time in a range where CCD line sensor 4 is not saturated. A red shading correction coefficient is computed for each picture element of CCD line sensor 4 so that the output of all picture elements of CCD line sensor 4 becomes uniform. A similar procedure is performed for the green LEDs and the blue LEDs. Since the irregularities in illumination are different for each color due to the characteristics of the optical system, the computation of the shading correction coefficient is conducted independently for each separated color. The storage time of CCD line sensor 4 is conducted for a uniform time for all three colors in order that CCD line sensor 4 does not become saturated.

Next, in step S14, the quantity of light ratios for the separated colors of the LEDs in LED block 1 are measured. For example, the red LEDs are made to emit light for a fixed time and the integral value of the output signals of CCD line sensor 4 is obtained. The shading correction circuit 28 is operated, using the shading correction coefficient obtained in step S13, to obtain the integral value of the output signals of CCD line sensor 4. For the green LEDs and the blue LEDs, the integral value of the output signals of CCD line sensor 4 are obtained in the same manner. The quantity of light ratio of each color is obtained by comparing these integral values. The reason for conducting this operation is that the quantity of light per single LED of each color LED varies and, although the number of each color LED is changed for each color in order to compensate for this variation, it is not possible to make the overall quantity of light uniform for each color. As a result, it is necessary to correct the output signals of the image elements. Determination of the quantity of light ratio can be performed by shading correction circuit 28 or CPU 13.

Since it is desirable that the quantity of light ratio of the overall LED emission of the three colors become 1:1:1 at the time of image reading, CCD line sensor output signals are adjusted using the storage time of the CCD line sensor and an electrical amplifying circuit (not illustrated). The quantity of light ratio of the LED light sources of the three colors is therefore made equivalent to 1:1:1. In summary, the storage time (which is equivalent to the light emission time of the appropriate LEDs) of CCD line sensor 4 for each color is determined by obtaining the quantity of light ratio. This storage time is then adjusted to provide an appropriate quality of light ratio. Image reading is conducted after adjustment of the CCD line sensor output.

In the above-described embodiment, the storage time (which is equal to the LED light emission time) of CCD line sensor 4 was adjusted. However, it is also acceptable to have a uniform storage time and to keep the LED light emission quantity uniform by changing the voltage applied to the LEDs.

In step S15, based on the shading correction coefficient obtained in step S13 and the storage time of CCD line sensor 4 obtained in step S14, the image of film original 3 is read, stored in memory 12, and then transferred to host computer 15 (step S16). The system then loops back to step S15 where an additional film original 3 is read.

In the case where the shading correction coefficient is obtained immediately before the reading of film original 3 and the correction coefficient and the storage time are obtained for each film original 3, it is acceptable to have a configuration where the process loops from step S16 to step S13.

In the present embodiment, a mechanism is used which performs two-dimensional image reading using carriage movement based on the CCD of one line and movement by stepping motor 7. However, it is also acceptable to use a reading mechanism based on the area CCD of two dimensions, or any other reading mechanisms.

In the present embodiment, an LED light source was adopted as an example of a light source. However, it is also acceptable to attach either red, green and blue filters to each of three xenon lamps, or to attach filters of red, green and blue filters to each of three fluorescent lamps.

The present invention is not limited to the measurement of the shading correction coefficient and the quantity of light ratio, but can also be used in all cases where necessary correction coefficients for each color of color separation exist.

The embodiments of the image reading apparatus according to the present invention are characterized by possessing light emission means (e.g., LED block 1) for switching among the emission colors of three primary colors of light, shading correction coefficient computation means for obtaining the shading correction coefficient in order to correct irregularities in the image signals of a photoelectric conversion means (e.g., CCD line sensor 4) which occur in each emission color of the light emission means, and quantity of light ratio measurement means for obtaining the ratio of the quantity of light of each emission color in order to equalize for each emission color the quantity of emitted light of each emission color of the light emission means (see, e.g., FIG. 5, step S14), and by obtaining the shading correction coefficient by the shading correction coefficient computation means, and the quantity of light ratio by the quantity of light ratio measurement means when the power source is turned ON, or immediately before the reading of an original.

In order to obtain the shading correction coefficient and the correction coefficient required for reading the quantity of light ratio in color separation when the power source is turned ON or immediately before reading of an original, there is no need to provide a memory means which stores in advance the correction coefficient, and there is no need to estimate in advance the deterioration over time of the light emission means and to record the correction coefficient in memory.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image reading apparatus for reading an original medium, comprising:

a light emission unit emitting colors of light;

a photoelectric conversion unit receiving the light emitted by said light emission unit and producing image signals corresponding to the received light, the light emitted from said light emission unit travelling along a light transmission path from said light emission unit to said photoelectric conversion unit;

a positioning unit for positioning an original medium in the light transmission path to cause the light emitted by said light emission unit to interact with the original medium and then be received by said photoelectric conversion unit;

a shading correction coefficient unit determining respective shading correction coefficients of each color of light emitted by said light emission unit immediately before an original medium is positioned in the light transmission path by said positioning unit; and a shading correction mechanism using the shading correction coefficients determined by said shading correction coefficient unit to correct irregularities of the image signals produced by said photoelectric conversion unit from light emitted by said light emission unit, interacting with the original medium and received by said photoelectric conversion unit when an original medium is positioned in the light transmission path by said positioning unit.

2. An apparatus as in claim 1, wherein said photoelectric conversion unit comprises a plurality of picture elements and said shading correction coefficient unit determines the shading correction coefficients by measuring the illumination of said photoelectric conversion unit by each color of light emitted by said light emission unit and computing a shading correction coefficient for each picture element of said photoelectric conversion unit to cause the output of all picture elements of said photoelectric conversion unit to become uniform.

3. An apparatus as in claim 1, wherein said light emission unit comprises LEDs of three colors.

4. An image reading apparatus as in claim 1, wherein the same shading correction coefficients determined by said shading correction coefficient unit are used by said shading correction mechanism with a first original source positioned in the light transmission path by said positioning unit, and with subsequent original sources positioned in the light transmission path by said positioning unit.

5. An image reading apparatus as in claim 1, further comprising:

a quantity of light ratio measurement unit determining the ratio of the quantity of light of each emission color emitted by said light emission unit for equalizing the quantity of light emitted by said light emission unit, said quantity of light ratio measurement unit determining the ratio of the quantity of light for each emission color immediately before an original medium is positioned in the light transmission path by said positioning unit; and a quantity of light correction mechanism using the ratio of the quantity of light of each emission color determined by said quantity of light ratio measurement unit to adjust the quantity of light emitted by said light emission unit.

6. An apparatus as in claim 5, wherein said quantity of light ratio measurement unit determines a ratio of the quantity of light by obtaining an integral value of the output signals of said photoelectric conversion unit for each color of light emitted by said light emission unit and comparing the integral values for each color of light.

7. An apparatus as in claim 6, wherein said light emission unit emits the three primary colors of light and image signals produced by said photoelectric conversion unit are adjusted so that the quantity of light ratio measurement becomes approximately 1:1:1 for the three primary colors of light.

8. An apparatus as in claim 1, wherein the shading correction coefficient unit determines respective shading correction coefficients each time the image reading apparatus is turned ON.

9. An image reading apparatus for reading an original medium, comprising:

a light emission unit emitting colors of light;

a photoelectric conversion unit receiving the light emitted by said light emission unit and producing image signals corresponding to the received light, the light emitted from said light emission unit travelling along a light transmission path from said light emission unit to said photoelectric conversion unit;

a positioning unit for individually positioning respective original mediums in the light transmission path by positioning a first original medium and then positioning respective subsequent original mediums in the light transmission path, to cause the light emitted by said light emission unit to interact with a respective original medium positioned in the light transmission path and then be received by said photoelectric conversion unit;

a shading correction coefficient unit determining respective shading correction coefficients of each color of light emitted by said light emission unit immediately before a respective original medium is positioned in the light transmission path; and a shading correction mechanism using the shading correction coefficients determined by said shading correction coefficient unit to correct irregularities of the image signals produced by said photoelectric conversion unit from light emitted by said light emission unit, interacting with a respective original medium and received by said photoelectric conversion unit when the respective original medium is positioned in the light transmission path by said positioning unit, said shading correction coefficient unit determining shading correction coefficients immediately before a first original medium is positioned in the light transmission path by said positioning unit and determining new, respective shading correction coefficients for each subsequent original medium positioned in the light transmission path by said positioning unit immediately before the respective subsequent original medium is positioned in the light transmission path.

10. An apparatus as in claim 9, wherein said photoelectric conversion unit comprises a plurality of picture elements and said shading correction coefficient unit determines the shading correction coefficients by measuring the illumination of said photoelectric conversion unit by each color of light emitted by said light emission unit and computing a shading correction coefficient for each picture element of said photoelectric conversion unit to cause the output of all picture elements of said photoelectric conversion unit to become uniform.

11. An apparatus as in claim 9, wherein said light emission unit comprises LEDs of three colors.

12. An image reading apparatus for reading an original medium, comprising:

a light emission unit emitting colors of light;

a photoelectric conversion unit receiving the light emitted by said light emission unit and producing image signals corresponding to the received light, the light emitted from said light emission unit travelling along a light transmission path from said light emission unit to said photoelectric conversion unit;

a positioning unit for positioning an original medium in the light transmission path; and a shading correction mechanism determining respective shading correction coefficients of each color of light emitted by the light emission unit immediately before an original medium is positioned in the light transmission path by said positioning unit.

13. An apparatus as in claim 12, wherein the shading correction mechanism determines respective shading correction coefficients each time the image reading apparatus is turned ON.

* * * * *